United States Patent
Dobies et al.

(10) Patent No.: US 6,822,638 B2
(45) Date of Patent: Nov. 23, 2004

(54) POINTING DEVICE FOR NAVIGATING A 3 DIMENSIONAL GUI INTERFACE

(75) Inventors: Joshua M. Dobies, Lafayette, CA (US); Matthias Eichstaedt, San Jose, CA (US); Qi Lu, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/309,037

(22) Filed: May 10, 1999

(65) Prior Publication Data

US 2002/0196231 A1 Dec. 26, 2002

(51) Int. Cl.⁷ ................................................ G09G 5/08
(52) U.S. Cl. ........................ 345/161; 345/157; 345/784
(58) Field of Search ................................. 345/156, 161, 345/163, 168, 157, 167, 766, 784, 794, 796

(56) References Cited

U.S. PATENT DOCUMENTS

| | | | |
|---|---|---|---|
| 5,095,302 A | | 3/1992 | McLean et al. |
| 5,296,871 A | | 3/1994 | Paley |
| 5,298,919 A | | 3/1994 | Chang |
| 5,313,229 A | | 5/1994 | Gilligan et al. |
| 5,313,230 A | | 5/1994 | Venolia et al. |
| 5,446,481 A | | 8/1995 | Gillick et al. |
| 5,473,344 A | | 12/1995 | Bacon et al. |
| 5,530,455 A | | 6/1996 | Gillick et al. |
| 5,619,231 A | | 4/1997 | Shouen |
| 5,635,954 A | | 6/1997 | Yamada |
| 5,648,798 A | | 7/1997 | Hamling |
| 5,712,725 A | | 1/1998 | Faltermeier et al. |
| 5,771,038 A | * | 6/1998 | Wang .......................... 345/163 |
| 5,867,808 A | * | 2/1999 | Selker et al. .................. 702/41 |
| 5,912,661 A | * | 6/1999 | Siddiqui ...................... 345/166 |
| 6,075,518 A | * | 6/2000 | Pruchniak .................... 345/157 |
| 6,166,723 A | * | 12/2000 | Schena et al. ............... 345/184 |
| 6,198,473 B1 | * | 3/2001 | Armstrong ................... 345/163 |
| 6,480,184 B1 | * | 11/2002 | Price ........................... 345/163 |

* cited by examiner

*Primary Examiner*—Henry N. Tran
(74) *Attorney, Agent, or Firm*—Jon A. Gibbons; Fleit, Kain, Gibbons, Gutman, Bongini & Bianco, P.L.

(57) ABSTRACT

A pointing device for entering data into an information processing system for a 3-dimensional graphical user interface. The pointing device comprises: a switch mounted on a pointing device for producing a first signal during actuation by a vertical downward pressure on a first region of the switch; a circuit for coupling the first signal to a Z-axis on a display attached to the information processing system so as to control movement of information along the Z-axis presented on the display. In another embodiment, the switch produces a second signal by a vertical downward pressure on a second region of the switch; and a circuit for coupling the second signal to a Z-axis on the display so as to move information present on the display along the Z-axis in a direction opposite to that of the movement along the Z-axis in response to the first signal.

16 Claims, 8 Drawing Sheets

IBM Shop: Check Out - Netscape

File  Edit  View  Go  Communicate  Help

Registered users

If you have forgotten your password, please enter your information again below:

Username

Password

Login now

* This is a required field

Enter your billing address

*Title
Mr.

*First name

*Last name

Company

Enter your shipping address

☑ Same as billing information

*Title
Mr.

*First name

*Last name

Company

Request a Printed Catalog

*Country
United States

*Country
United States

*e-mail

*e-mail

*Daytime phone number

*Daytime phone number

Evening phone number

Evening phone number

FAX Number

FAX Number

The data you provide here may be used to provide you with information from IBM or our business partners about our products, services, or activities.

☐ Please do not use the information collected here for future marketing or promotional contacts or other communications beyond the scope of this transaction.

Request a Printed Catalog

POINTING DEVICE FOR NAVIGATING A 3 DIMENSIONAL GUI INTERFACE

CROSS-REFERENCE TO RELATED APPLICATIONS

Not applicable

BACKGROUND OF THE INVENTION

1. Field of the Invention

The invention disclosed broadly relates to the field of pointing devices for computer input, and more particularly relates to the field of navigation over a 3-dimensional graphical user interface.

2. Description of the Related Art

The use of graphical user interfaces on computers and appliances continues to grow. There are several trends in the computer industry that have motivated the increase in graphical user interfaces. First, newer versions of operating systems and applications continues to make use of more graphical components. The "look and feel" of windows and windows-type operating systems has become a de facto standard. The use of windowing type operating systems such as Microsoft Windows 3.1/95/NT, IBM OS/2, Apple Copeland and others present information to a user not only in a two dimensional GUI (Graphic User Interface) but also in a third dimension sometimes called "depth" by presenting one window on top of another window.

Another trend in the computer industry is the availability of sophisticated applications that present many application tools through the use of graphical icons such as tool bars, elevator bars, different document views, wizards and by other methods to present information to users. It is common for these applications to present more and more information to users that require navigating with a mouse and a keyboard not only in 2-dimensions, that is horizontally and vertically, but selecting windows, toolbars and icons presented at many different levels or depths is often required. The pointing devices available today such the mouse, the trackball, the joystick, the IBM TrackPoint, the Apple Glide Pad and other available pointing devices provide satisfactory selections in the horizontal and vertical direction, that is in the 2-dimensional space, but the selection of a graphic or a window or an icon in a 3-dimensional space with a mouse or equivalent pointing device can be cumbersome. Accordingly, a need exists for a pointing device that enables easier navigation of a GUI in not only a 2-dimensional space, but to enable easier navigation in a 2-dimensional space with depth, that is a 3-dimensional space.

Another trend in the computer industry is that the size of the computer display has remain some what constant over the last few years as the number of icons, graphics, tool bars and other graphical information. When one or more applications are opened at the same time, this leads to a clutter windows interface. To overcome this, many applications are stacked or cascaded one on-top-of-another. The increase in the amount of information presented coupled with the relative stability in the size and the resolution of the display has made navigation of the windows interface more difficult. Navigation is especially difficult when choosing applications that use the dimension of depth. Therefore a need exist to provide a pointing device to navigate 3-dimensional GUI.

Still another trend that has motivated the use of more graphics are 3-dimensional games such as DOOM, Tank Commander, and Flight Simulator. These games present a virtual 3-dimensional environment in which the user must navigate. Typically joysticks have been used most effectively for these interfaces, but the use of a joystick for general business applications such as a spreadsheet or word processor is often cumbersome. To overcome this, the user is oftentimes forced to have two pointing devices, one pointing device for games, such as a joystick, and a separate pointing device, such as a mouse, for business applications. The use of two pointing devices can be expensive, difficult to set up, and adds to desktop clutter. Accordingly, a need exists to provide a pointing device that can work effectively with games and with business applications.

Yet, still another recent development that has caused an increase in graphics is the popularity of the Internet and of the World Wide Web ("Web"). The Web has become immensely popular largely because of the ease of finding information and the user-friendliness of today's browsers. A feature known as hypertext allows a user to access information from one Web page to another Web page by simply pointing with a mouse, or equivalent pointing device, at the hypertext and clicking. Another feature that makes the Web attractive is having the ability to process the information in remote Web pages without the requirement of having a specialized application program for each kind of content accessed. Thus, the same content is viewed across different platforms. Browser technology has evolved to enable the running of applications that manipulate this content across a wide variety of different platforms. The display of Web pages by browsers are often packed with information in both 2-dimensional and 3-dimensional presentations. In fact the "look and feel" of many browsers continues to be incorporated into more and more applications and operating systems. For example, Microsoft Windows 98™ has an option to display the entire user desktop as a Web page. One standard for 3-dimensional web pages is available called VRML (virtual reality mark-up language) which easily adds the ability to view standard 3-dimensional web pages over the Internet. For an example see Paragraph International. Since VRML and virtual reality environments have a new dimension of depth added to the standard 2-dimensional GUI, a need exists for a pointing device to navigate a 3-dimensional interface.

One solution to positioning a cursor in 3-D space is found in U.S. Pat. No. 5,473,344 by Glade B. Bacon, et al., entitled a "3-D Cursor Positioning Device" issued on Dec. 5, 1995. The patent discloses placing a slider or wheel along the side of a mouse. The use of a slider or wheel along the side position of a mouse makes this type of device extremely awkward to manipulate and forces the user to engage in unnatural hand movements. Moreover, many times any additional input device on the side of a mouse interferes with guiding the mouse position. Accordingly, a need exists for a positioning device to overcome this and the above limitations.

SUMMARY OF THE INVENTION

Briefly, according to the invention, an input device for entering data into an information processing system for a 3-dimensional graphical user interface. The input device includes a joystick actuator for sensing forces thereon in at least three directions. The joystick actuator is mounted on a pointing device, such as a standard two button mouse. When activated with a downward pressure, the joystick actuator produces a first signal. A software driver is configured to couple the first signal to a Z-axis on a display attached to the information processing system so as to control movement of information along the Z-axis presented on the display.

During the vertical downward pressure, any horizontal pressure detected due to movement of the joystick actuator to a first position or a second position causes the software driver to change a direction and a rate of movement along the Z-axis. The rate of movement is changed as a function of the rate of change of the horizontal pressure to move the joystick actuator.

BRIEF DESCRIPTION OF THE DRAWINGS

FIG. 6 is an example 2-dimensional interface for fill-in forms in interface on a browser with a scroll bar.

FIG. 7 is an example 3-dimensional interface of the fill-in the forms interface of FIG. 6 for use with the pointing device according to the present invention.

DETAILED DESCRIPTION OF AN EMBODIMENTS

Figure 1:
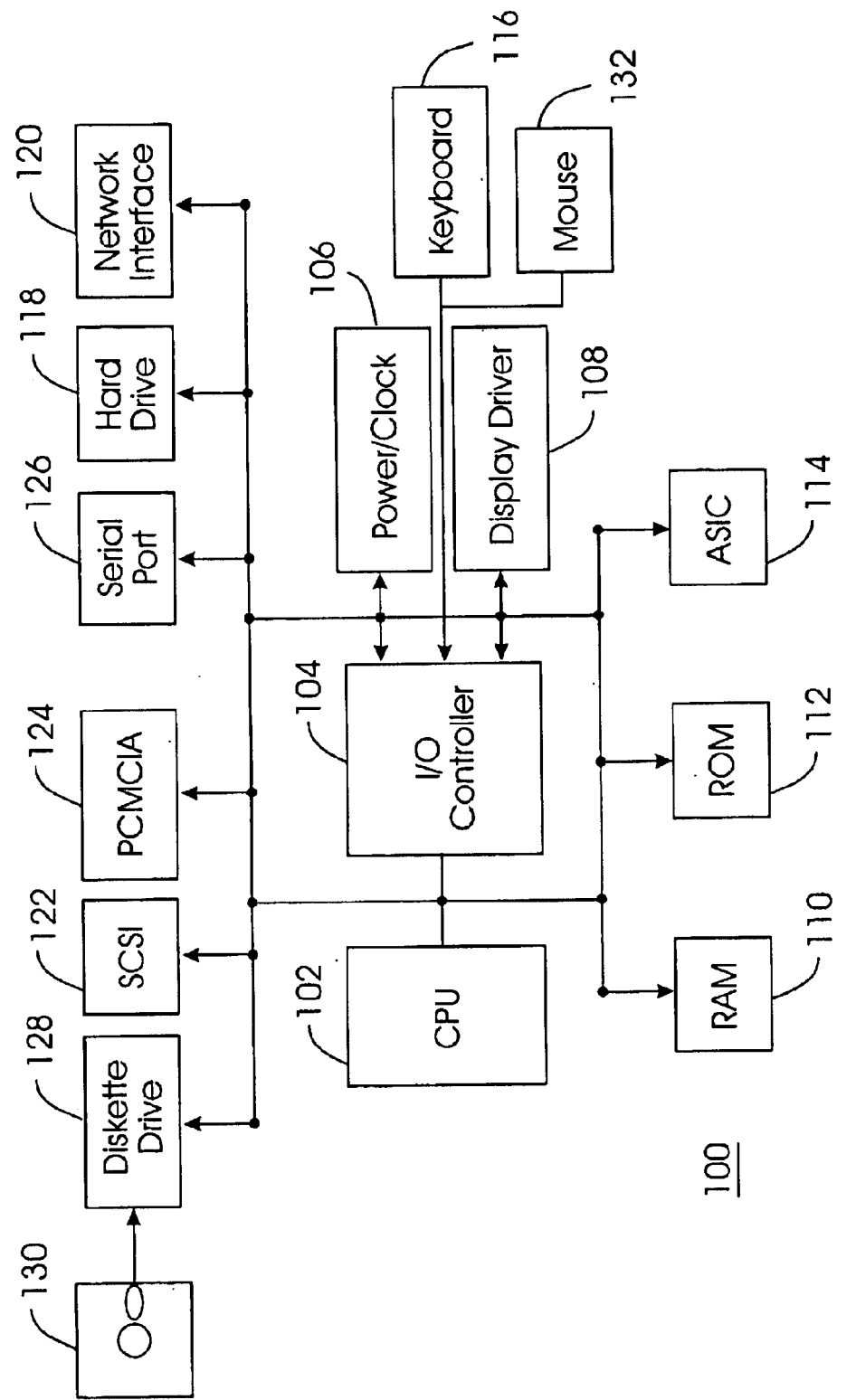
FIG. 1 is a block diagram of the major electrical components of an information processing system according to the present invention.

Referring to FIG. 1, there is shown a block diagram of the major electrical components of an information processing system 100 in accordance with this invention. The electrical components include: a central processing unit (CPU) 102, an Input/Output (I/O) Controller 104, a system power and clock source 106; display driver 108; RAM 110; ROM 112; ASIC (application specific integrated circuit) 114 and a hard disk drive 118. A keyboard 116 with a mouse 132 receives the user input. Other pointing devices besides a mouse 132 can be substituted such as a trackball, joystick, glidepad, TrackPoint, and touch screen. These are representative components of a computer. The operation of a computer comprising these elements is well understood. Network interface 120 provides connection to a computer network such as Ethernet, TCP/IP or other popular protocol network interfaces. Optional components for interfacing to external peripherals include: a Small Computer Systems Interface (SCSI) port 122 for attaching peripherals; a PCMCIA slot 124; and serial port 126. An optional diskette drive 128 is shown for loading or saving code to removable diskettes 130. The system 100 may be implemented by combination of hardware and software. Moreover, the functionality required for using the invention may be embodied in computer-readable media (such as 3.5 inch diskette 130) to be used in programming an information-processing apparatus (e.g., a personal computer) to perform in accordance with the invention.

Figure 2:
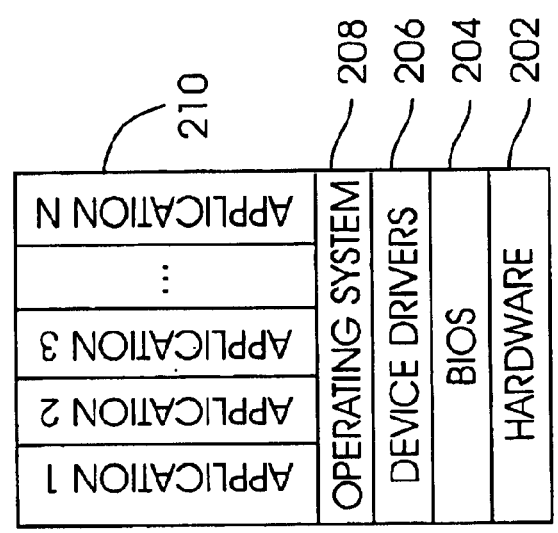
FIG. 2 is a block diagram illustrating the software hierarchy for the information processing device of FIG. 1 according to the present invention.

FIG. 2 is a block diagram illustrating the software hierarchy of for the information processing system of FIG. 1 according to the present invention. The hardware 202 is the information processing system of FIG. 1. BIOS (Basic Input Output System) 204 is a set of low level of computer hardware instructions, usually stored in ROM 112, for communications between an operating system 208, device driver(s) 206 and hardware 202. Device drivers 206 are hardware specific code used to communicate between and operating system 208 and hardware peripherals such as a mouse 132, CD ROM drive or printer. Applications 210 are software application written in C/C++, assembler or equivalent. Operating system 208 is the master program that loads after BIOS 204 initializes, that controls and runs the hardware 202. Examples of operating systems include DOS, Windows 3.1/95/98/NT, Unix, Macintosh, OS/2 and equivalent.

Figure 3:
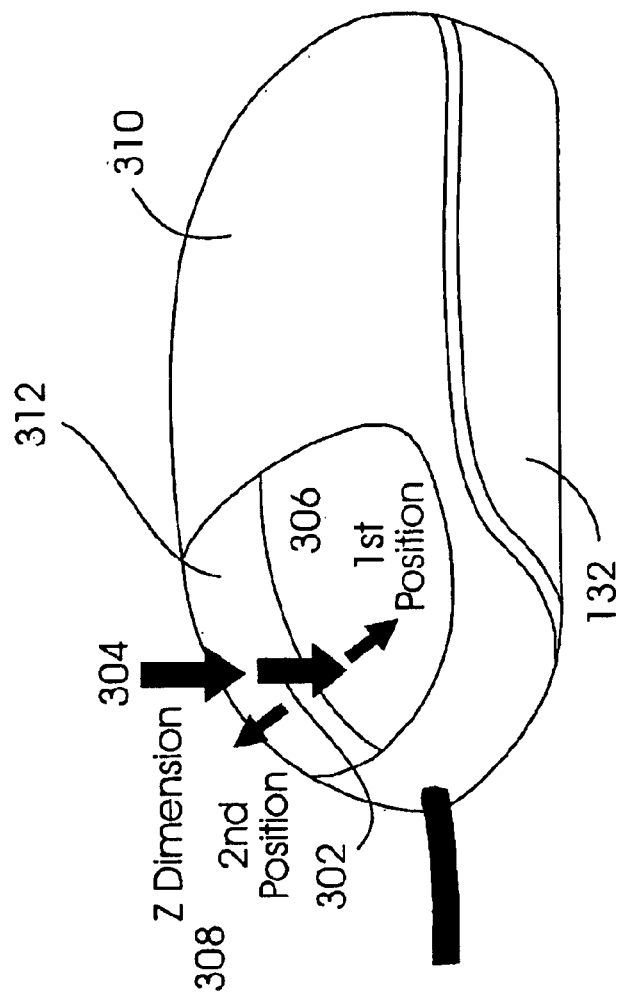
FIG. 3 is an elevational view of one embodiment of a pointing device according to the present invention.
Figure 4:
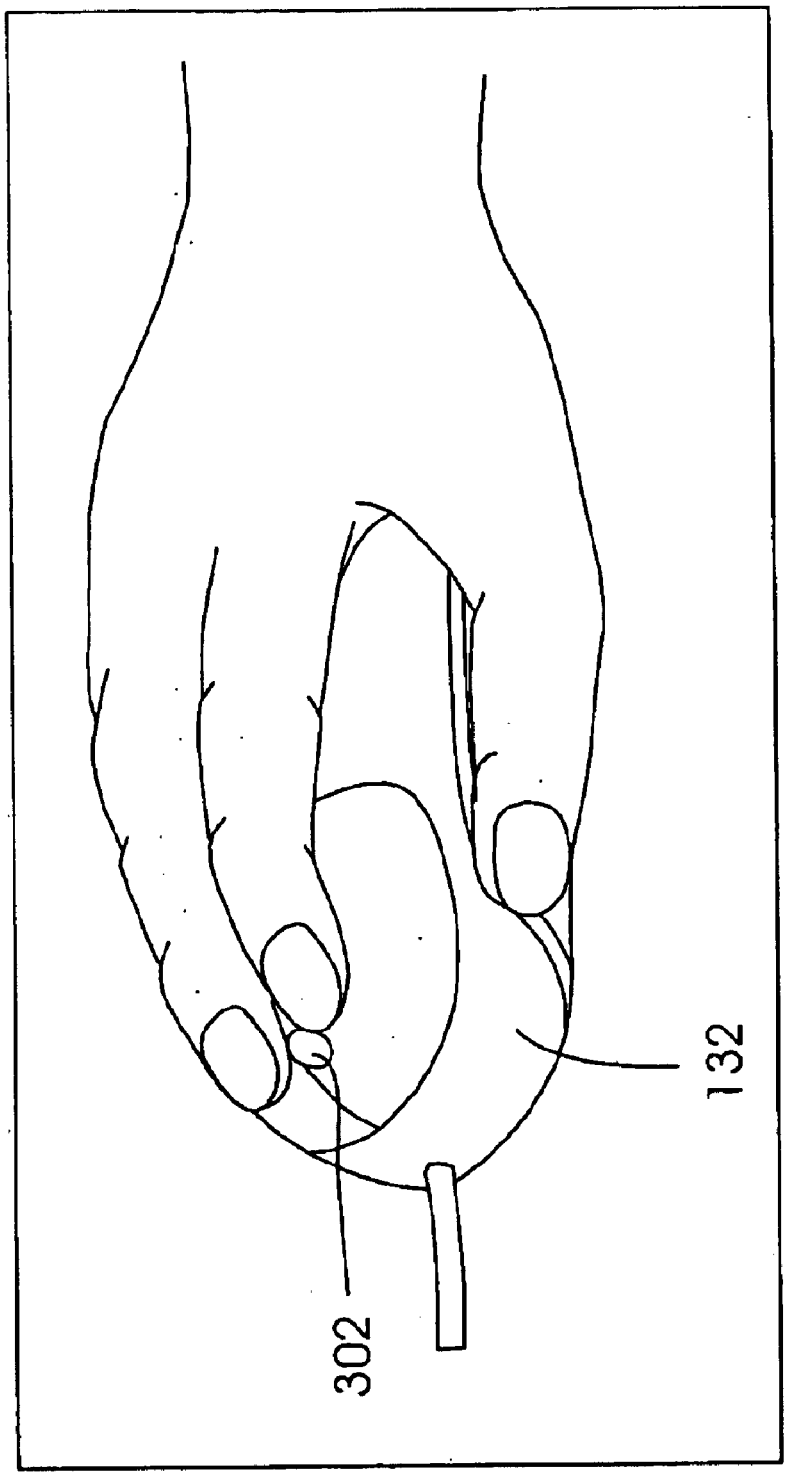
FIG. 4 is an elevational view of FIG. 3 with a users right hand positioned on the mouse with the joystick actuator being selected with the user's second finger of the right hand according to the present invention.

Turning now to FIG. 3 there is shown an elevational view of one embodiment of a pointing device according to the present invention. The joystick actuator 302 is mounted on a mouse 132 with mouse buttons 312. The exact location of the joystick actuator 302 on the mouse is not important, and the placement can be made anywhere that is ergonomically comfortable to a user. In one embodiment, thejoystick actuator 302 is positioned between the two mouse buttons 312, so that a user's palm sits on a top surface 310 of the mouse 132 with the joystick actuator 302 between either the first and second finger or between the second and third finger of the user's hand (as shown in FIG. 4). A vertical downward coaxial force 304 on joystick actuator 302 is illustrated. This vertical downward coaxial force 304 as shown is perpendicular to the x-y plane (not shown) upon which the mouse 132 is resting. Shown in FIG. 4 is an elevational view of FIG. 3 with a user's right hand positioned on the top surface 310 of the mouse 132 with the joystick actuator 302 being selected with the user's second finger of the right hand according to the present invention. It should be understood to those skilled in the art that mouse 132 can be any of a variety of pointing devices including a trackball, glide pad or touch pad. As shown in FIG. 4, the joystick actuator 302 is located on the mouse 132 to be operable by any non-thumb finger of a user (i.e. the middle finger, the second finger, the index finger and the ring finger) when the user's palm is resting on the top surface 310 of the mouse 132.

The Mouse 132 is a standard one, two or three button mouse, such as those available from IBM part number 96F9272 and other computer manufacturers. The joystick actuator 302 is designed to sense force in a least three directions. In one embodiment, the lower end of the joystick actuator 302 is rigidly secured to a force transducer (not illustrated) such as a thin film resistive strain gauge in the manner set forth in the U.S. Pat. No. 5,867,808, application Ser. No. 08/181,648, entitled Force Transducer with Printed Strain Gauges, filed Jan. 14, 1994 which is commonly assigned herewith to IBM and is hereby incorporated by reference. While the means for sensing tactile input on the joystick actuator 302 comprises strain gauges, the present invention may employ other mechanical and optical-electrical means for sensing in the downward and horizontal directions including rocker switches, optical electrical switches, encoder wheels and other pressure sensitive switches. When the user's finger pushes the joystick actuator 302 with a vertical downward coaxial force 304 combined with a force normal to the joystick actuator 302 to a first position 306 this produces a Z-direction or third dimension signal through information processing system 100 up through BIOS 204 to application 210 to move forward through the Z-direction (depth) on the display. For example in an application 210 that depicts a 3-dimensional room, movement forward, that is deeper, through the room is made with joystick actuator 302, while movement up or down (vertically) and left or right (horizontally) in the room is made with standard mouse movements. When the user's finger pushes the joystick actuator 302 with a vertical downward coaxial force 304 combined with a force normal to the joystick actuator 302 to a second position 308, this produces cursor movement backward in the Z-direction (depth). Returning to the 3-dimensional room example, moving forward or backward through the room is accomplished by producing the vertical downward coaxial force 304 on the actuator joystick 302 with the user's finger in either a first or a second position 306 and 308. Once the user releases pressure or more generally force from the joystick actuator 302, the joystick actuator 302 returns to its quiescent or resting position. Repeatedly pushing the joystick actuator 302 enables traveling a longer distance in the Z-direction (depth) on the display. Like the IBM TrackPoint pointing device, the joystick actuator 302 is positively biased to return to its quiescent position when no force is exerted. The speed of traversing the Z-direction is directly related to the amount of force exerted on the joystick actuator 302, so that the greater the force, the faster the movement. Using a joystick actuator 302 that senses a vertical downward coaxial force 304 combined with a force normal overcomes some of the problems with prior art systems where the third dimension is mapped to side buttons on the same horizontal X-Y plane that is covered by the conventional mouse. The use of a vertical push button overcomes this problem of mapping the X-Y movement of a mouse with a horizontal button (that controls the Z-direction) in the same plane.

Figure 5:
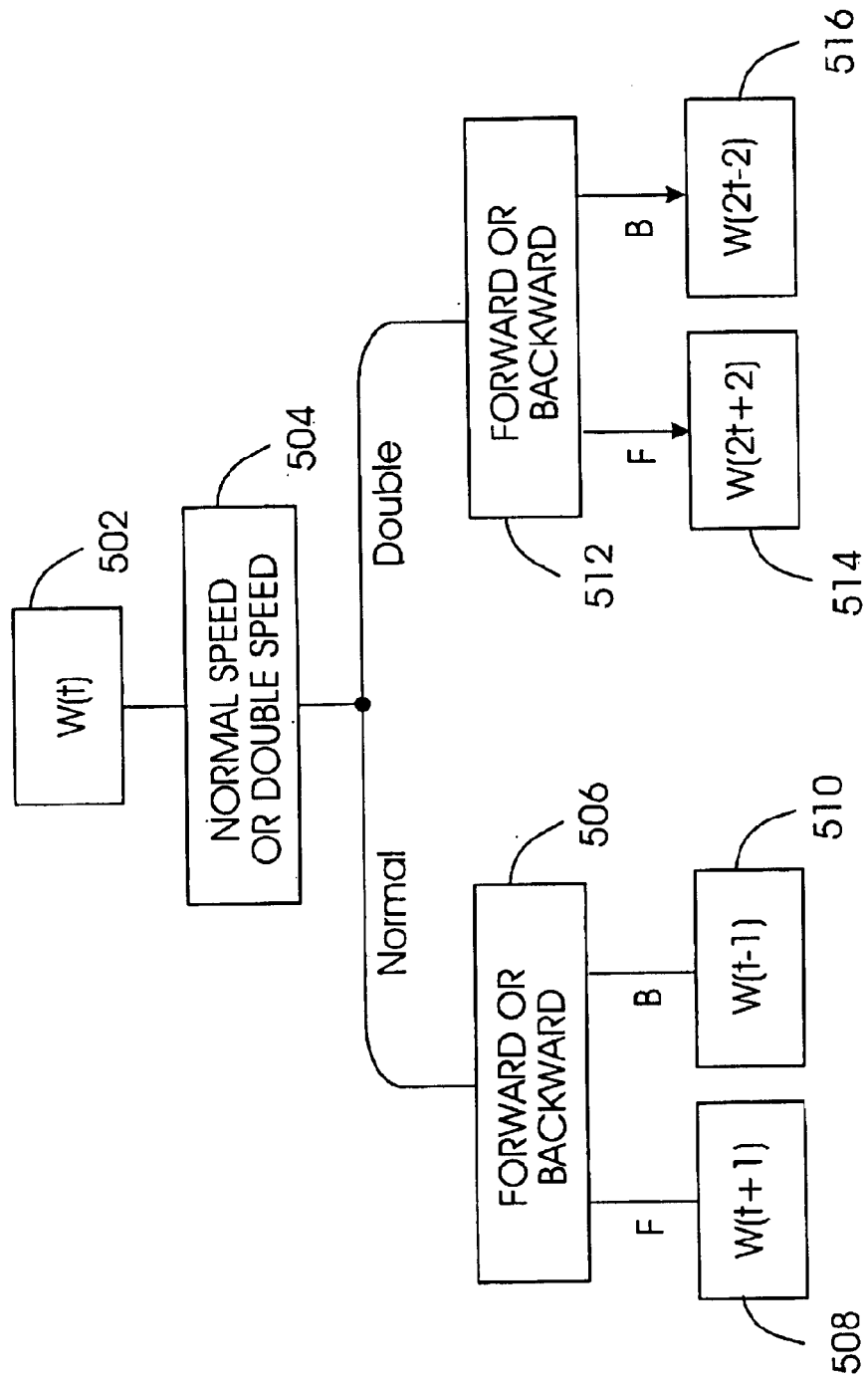
FIG. 5 is a flow diagram for an application or system BIOS using the joystick actuator according to the present invention.

Turning now to FIG. 5, shown is a flow diagram 500 for an application or system BIOS 204 using the joystick actuator according to the present invention. Let W represent a queue of windows comprising $w_1, w_2, w_3, \ldots w_n$, where $w_1$, is the first window in the queue window closest to the user, and where $w_n$ is the last window in the queue furthest from the user. In a windows type operating system, it is common to bring a desired window to the top to become the active window by selecting the window with a mouse button click. In Windows 3.1/95/98 and IBM OS/2 this is accomplished using the left mouse button. When a user selects a window with a mouse, say window $w_1$, then the next logical window in the queue will be modulo n+1 $w_{i+1}$. As mentioned earlier, it is often the case that a window is obscured by any number of n other windows. In this case, it is difficult to bring such a window to the top of the stack using a prior art mouse. The present invention enables the user to select a desired window $w_1$ by mapping a 3rd dimension to the window queue W itself. Without any clicking or reposition of the mouse 132, the user can make adjustments to the window queue W. Let W(t), be the state of the Window queue W at time t. While the user applies pressure to the joystick actuator 302, the state of W may be altered as follows:

$W(t=0)=w_1, w_2, w_3, \ldots w_n$ $W(t=1)=w_2, w_3, \ldots w_n, w_1$ $W(t=2)=w_3, \ldots w_n, w_1, w_2$ And placing a force normal to the joystick actuator 302 to move the joystick actuator 302 to the second position 308, would cause the windows to cycle in the opposite direction. The concept of speed of the navigation of windows queue W can be incorporated by the rate of change of pressure or force against the joystick actuator 302 in the first position 306 or the second position 308 combined with the vertical downward coaxial force 304. The rate of change of pressure or the force against the joystick actuator in one embodiment are distinct pressures such as one of two pressures. For example, if the speed doubled then W(t) would be modified to as W(2t). Returning to the flow diagram 500, the process begins at current Window queue W at time t, step 502. A determination is made if the force on joystick actuator 302 is a normal or a double speed change in force, step 504. When the force is a normal force change, a determination is made to see if the joystick actuator 302 is in a first position 306 or a second position 308 (i.e., forward or backward), step 506. If the joystick actuator 302 is in the first position 306, the state of the Window queue changes to W(t+1), step 508. If the joystick actuator 302 is in a second position 308, the Window queue is changed to W(t+1), step 510. In another embodiment, the Window queue is updated by modulo n+1 W(t+1) in the first position 306 and by modulo n+1 W(t−1) in the second position 308. When the force is determined to be a double force change in step 504, a determination is made to see if the joystick actuator 302 is in a first position 304 or in a second position 308, step 512. In a first position 306, the Window queue is updated as W(2t+2), step 514 and Window queue is updated as W(2t−2) when the joystick actuator 302 is in the second position 308, step 516. The state of W(t) for a double scroll rate is given by:

$W(t=0)=w_1, w_2, w_3, w_4, w_5, \ldots w_n$ $W(t=1)=w_3, w_4, w_5, \ldots w_n, w_1, w_2$ $W(t=2)=w_5, \ldots w_n, w_1, w_2, w_3, w_4$.

Figure 6B:
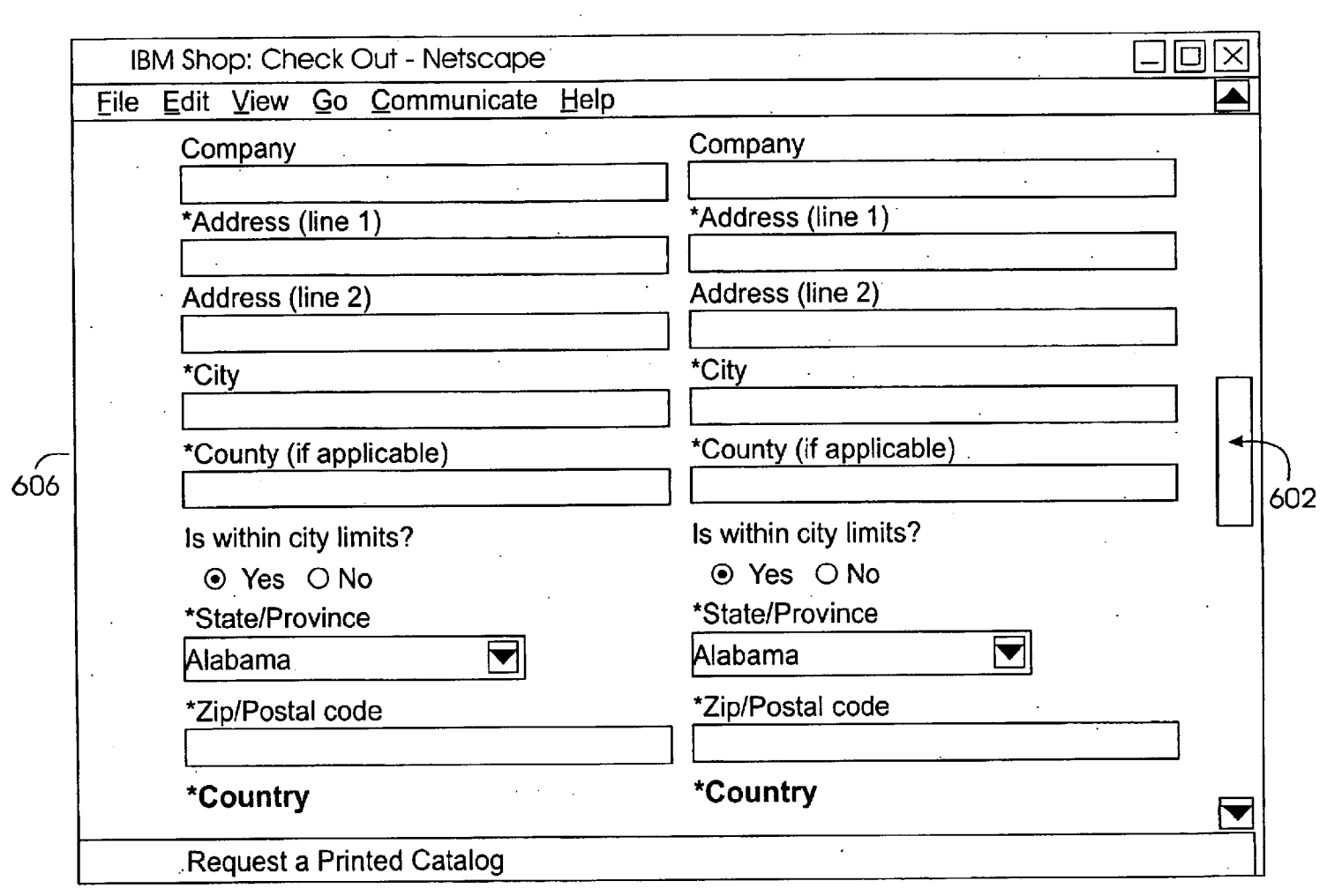

As an example of scrolling through a windows queue W, a Web browser application is described. A user using an application 210 such as Microsoft Internet Explore or Netscape Navigator often comes across forms to fill-out on the Web. A simple sales purchase may require a first and last name, a company, a street address, an item order number, payment information such as credit card information and much more. FIG. 6 is an example 2-dimensional forms interface 600 on a browser with a scroll bar 602. Not all the information for the form can fit onto one page. To present information larger than a screen, the current Web pages employ a scrollable window where the information to be entered can be scrolled up or down in order to facilitating viewing other parts of the online form by clicking on it. To view or enter additional information, the user is forced to move the scroll bar 602 up or down to view additional data. Refer to views 604, 606, 608.

Figure 7:
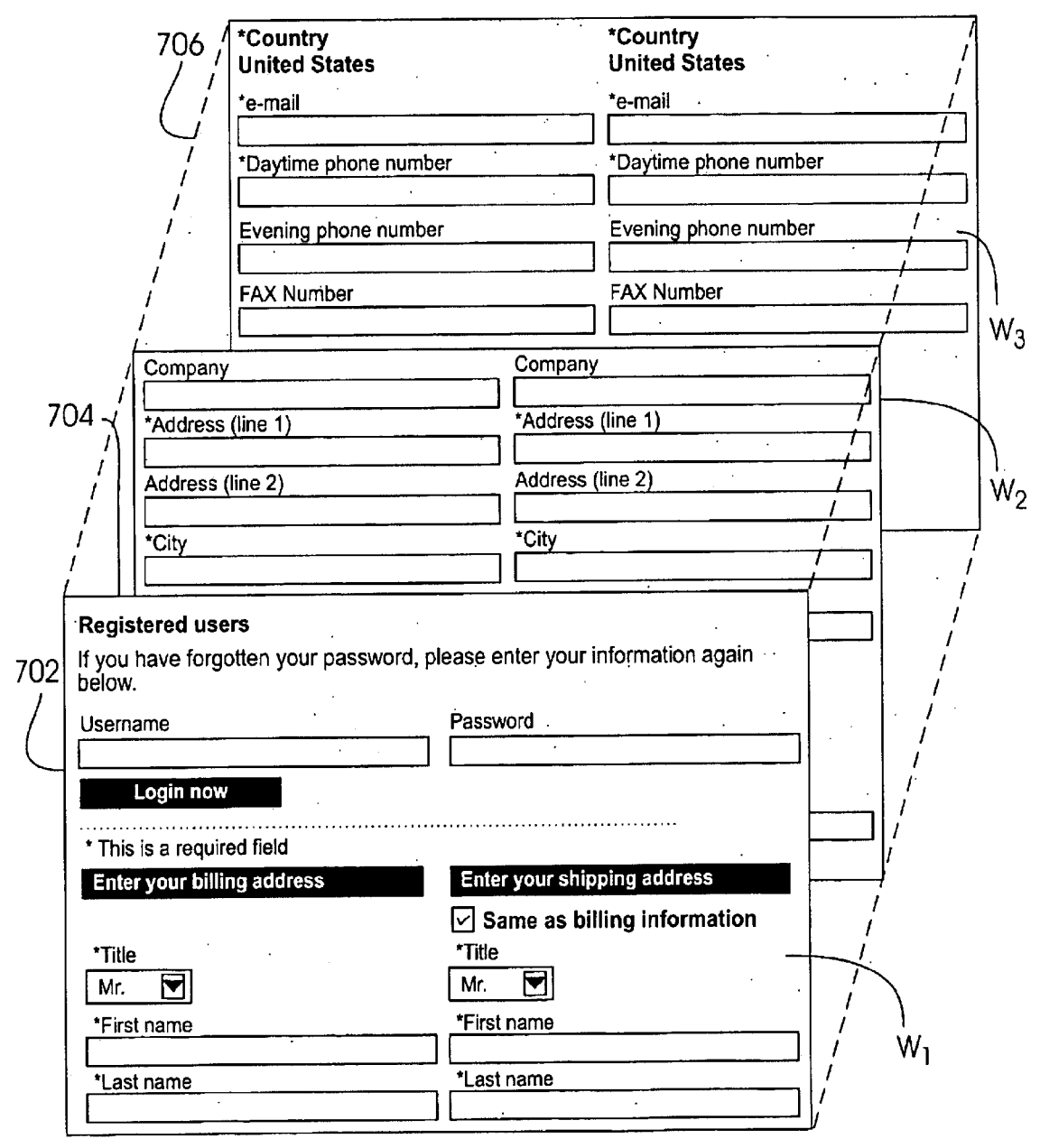

Referring now to FIG. 7, there is shown an example 3-dimensional interface of the fill-in the forms interface of FIG. 6 for use with the pointing device according to the present invention. In the present invention the entry fields form a linear order 702, 704, 706 and can be accessed on the same way as the windows queue W are accessed as described above. Moving the joystick actuator 302 will switch the focus of the next W(t+1) or previous W(t−1) entry filed. This makes it easier to enter data at the end of a online form even when the whole form is too large to be displayed in the browser window itself. As a result of switching the focus to a field that is currently not displayed the browser will scroll to the currently focused field.

As another example of an application written to take example of the present invention 3-dimension pointing device, consider the multimedia player application under a Windows 98 operating system. The 3rd dimension is mapped to time. Accordingly, a user can use the present invention 3-dimensional mouse joystick actuator 302 to rewind or to advance the media player. In general, an application can use the 3-dimensional mouse of the present invention as a controller of direction and speed of any logical dimension.

Although a specific embodiment of the invention has been disclosed, it will be understood by those having skill in the art that changes can be made to this specific embodiment without departing from the spirit and scope of the invention.

The scope of the invention is not to be restricted, therefore, to the specific embodiment, and it is intended that the appended claims cover any and all such applications, modifications, and embodiments within the scope of the present invention.

What is claimed is:

1. An information processing system input device for entering data comprising:

a mouse for sensing movement in a horizontal plane upon which the mouse is resting, the mouse providing cursor control in two dimensions on a display attached to an information processing system;

a joystick actuator mounted on a top surface of the mouse so that the joystick actuator is operable by at least one of a user's index finger, middle finger, ring finger and pinky finger when a user's palm is resting on the top surface of the mouse; and a software driver providing cursor control in a third dimension of the display so that the cursor is controlled in the third dimension in response to a combination of:

(i) a vertical downward coaxial force on the joystick actuator applied in a direction which is perpendicular to the horizontal plane so as to move the joystick actuator from an upper vertical quiescent position to a lower vertical active position; and (ii) a force applied to the joystick actuator parallel to the horizontal plane, whereby a determination is made on whether the force applied parallel to the horizontal plane on the joystick actuator represents a double speed change in pressure, and if the force applied parallel to the horizontal plane on the joystick actuator represents a double speed change in pressure, then a scrolling speed in the third dimension of the display is doubled a scrolling speed in the third dimension of the display for a force that is less than the double speed change in pressure;

wherein the scrolling speed in the third dimension of the display is expressed by a positional state of a third dimension windows queue W, where the state of the windows queue W in time changes in proportion to the scrolling speed, where W is the windows queue in the third dimension comprising windows $w_1, w_2, w_3, \ldots w_n$, where $w_1$, is a first window in the windows queue W, and where $w_n$, is a last window in the windows queue W, whereby the change in state of the windows queue W(t) for a scrolling rate that is less than the double scroll rate in a first direction is given by $W(t=0)=w_1, w_2, w_3, w_4, w_5, \ldots w_n$
$W(t=1)=w_2, w_3, w_4, w_5, \ldots w_n, w_1$
$W(t=2)=w_3, w_4, w_5, \ldots w_n, w_1, w_2$ whereby the change in state of the windows queue W(t) for a scrolling rate that is the double scroll rate in the first direction is given by $W(t=0)=w_1, w_2, w_3, w_4, w_5, \ldots w_n$
$W(t=1)=w_3, w_4, w_5, \ldots w_n, w_1, w_2$
$W(t=2)=w_5, \ldots w_n, w_1, w_2, w_3, w_4$.

2. The information processing system input device as set forth in claim 1, wherein the joystick actuator is biased so as to return to a quiescent position where cursor control in the third dimension of the display is not provided.

3. The information processing system input device as set forth in claim 2, wherein the joystick is mounted between two buttons of the two button mouse.

4. The information processing system according to claim 1, wherein the software driver providing cursor control in a third dimension of the display includes providing cursor control in the third dimension along a plurality of windows stacked upon each other and controlling which one of the plurality of windows is positioned on top of the plurality of windows to become an active window.

5. The information processing system according to claim 1, wherein the force representing a double speed change in pressure and the force that is less than the double speed change in pressure each represent distinct pressures.

6. The information processing system according to claim 1, wherein the force representing a double speed change in pressure and the force that is less than the double speed change in pressure each represent one of two pressures.

7. An information processing system input device for entering data comprising:

a mouse for sensing movement in a horizontal plane upon which the mouse is resting, the mouse providing cursor control in two dimensions on a display attached to an information processing system;

a joystick actuator mounted on a top surface of the mouse so that the joystick actuator is operable by at least one of a user's index finger, middle finger, ring finger and pinky finger when a user's palm is resting on the top surface of the mouse; and a software driver providing cursor control in a third dimension of the display so that the cursor is controlled in the third dimension in response to a combination of:

(i) a vertical downward coaxial force on the joystick actuator applied in a direction which is perpendicular to the horizontal plane so as to move the joystick actuator from an upper vertical quiescent position to a lower vertical active position; and (ii) a force applied to the joystick actuator parallel to the horizontal plane, whereby a determination is made on whether the force applied parallel to the horizontal plane on the joystick actuator represents a double speed change in pressure, and if the force applied parallel to the horizontal plane on the joystick actuator represents a double speed change in pressure, then a scrolling speed in the third dimension of the display is doubled a scrolling speed in the third dimension of the display for a force that is less than the double speed change in pressure:

wherein the scrolling speed in the third dimension of the display is expressed by a positional state of a third dimension windows queue W, where the state of the windows queue W in time changes in proportion to the scrolling speed, where W is the windows queue in the third dimension comprising windows $w_1, w_2, w_3, \ldots w_n$, where $w_1$, is a first window in the windows queue W, and where $w_n$ is a last window in the windows queue W, whereby the change in state of the windows queue modulo n+1 W(t±1) for a scrolling rate that is less than the double scroll rate in a first direction is given by $W(t=0)=w_1, w_2, w_3, w_4, w_5, \ldots w_n$
$W(t=1)=w_2, w_3, w_4, w_5, \ldots w_n, w_1$
$W(t=2)=w_3, w_4, w_5, \ldots w_n, w_1, w_2$ whereby the change in state of the windows queue modulo n+1 W(t±1) for a scrolling rate that is the double scroll rate in the first direction is given by $W(t=0)=w_1, w_2, w_3, w_4, w_5, \ldots w_n$ $W(t=1)=w_3, w_4, w_5, \ldots w_n, w_1, w_2$
$W(t=2)=w_5, \ldots w_n, w_1, w_2, w_3, w_4$.

8. A method to enter data in an information processing system comprising:
   mounting a joystick actuator on a mouse providing cursor control in two dimension on a display attached to an information processing system by sensing a movement in a horizontal plane upon which the mouse is resting; and
   detecting forces applied on the joystick actuator within a software driver which is responsive to the combination of:
   (i) a vertical downward coaxial force on the joystick actuator in a direction which is perpendicular to the horizontal plane so as to move the joystick actuator from an upper vertical quiescent position to a lower vertical active position; and
   (ii) a force applied to the joystick actuator parallel to the horizontal plane,
      whereby a determination is made on whether the force applied parallel to the horizontal plane on the joystick actuator represents a double speed change in pressure, and
      if the force applied parallel to the horizontal plane on the joystick actuator represents a double speed change in pressure, then a scrolling speed in the third dimension of the display is doubled a scrolling speed in the third dimension of the display for a force that is less than the double speed change in pressure;
   wherein the joystick is operable by at least one of a user's index finger, middle finger, ring finger and pinky finger when a user's palm is resting on the top surface of the mouse;
   wherein the scrolling speed in the third dimension of the display is expressed by a positional state of a third dimension windows queue W,
   where the state of the windows queue W in time changes in proportion to the scrolling speed,
   where W is the windows queue in the third dimension comprising windows $w_1, w_2, w_3, \ldots w_n$,
   where $w_1$, is a first window in the windows queue W, and
   where $w_n$ is a last window in the windows queue W,
   whereby the change in state of the windows queue W(t) for a scrolling rate that is less than the double scroll rate in a first direction is given by
      $W(t=0)=w_1, w_2, w_3, w_4, w_5, \ldots w_n$
      $W(t=1)=w_2, w_3, w_4, w_5, \ldots w_n, w_1$
      $W(t=2)=w_3, w_4, w_5, \ldots w_n, w_1, w_2$
   whereby the change in state of the windows queue W(t) for a scrolling rate that is the double scroll rate in the first direction is given by
      $W(t=0)=w_1, w_2, w_3, w_4, w_5, \ldots w_n$
      $W(t=1)=w_3, w_4, w_5, \ldots w_n, w_1, w_2$
      $W(t=2)=w_5, \ldots w_n, w_1, w_2, w_3, w_4$.

9. The method according to claim 8, wherein the mounting a joystick actuator further includes:
   biasing the joystick actuator to return to a quiescent position where cursor control in the third dimension of the display is not activated.

10. The method according to claim 8, wherein the mounting a joystick actuator comprises mounting the joystick actuator on a two button mouse.

11. The method according to claim 8, wherein the mounting a joystick actuator comprises mounting the joystick actuator between two buttons of the two button mouse.

12. A method to enter data in an information processing system comprising:
   mounting a joystick actuator on a mouse providing cursor control in two dimension on a display attached to an information processing system by sensing a movement in a horizontal plane upon which the mouse is resting; and
   detecting forces applied on the joystick actuator within a software driver which is responsive to the combination of:
   (i) a vertical downward coaxial force on the joystick actuator in a direction which is perpendicular to the horizontal plane so as to move the joystick actuator from an upper vertical quiescent position to a lower vertical active position; and
   (ii) a force applied to the joystick actuator parallel to the horizontal plane,
      whereby a determination is made on whether the force applied parallel to the horizontal plane on the joystick actuator represents a double speed change in pressure, and
      if the force applied parallel to the horizontal plane on the joystick actuator represents a double speed change in pressure, then a scrolling speed in the third dimension of the display is doubled a scrolling speed in the third dimension of the display for a force that is less than the double speed change in pressure;
   wherein the joystick is operable by at least one of a user's index finger, middle finger, ring finger and pinky finger when a user's palm is resting on the top surface of the mouse;
   wherein the scrolling speed in the third dimension of the display is expressed by a positional state of a third dimension windows queue W,
   where the state of the windows queue W in time changes in proportion to the scrolling speed,
   where W is the windows queue in the third dimension comprising windows $w_1, w_2, w_3, \ldots w_n$,
   where $w_1$, is a first window in the windows queue W, and
   where $w_n$ is a last window in the windows queue W,
   whereby the change in state of the windows queue modulo n+1 W(t±1) for a scrolling rate that is less than the double scroll rate in a first direction is given by
      $W(t=0)=w_1, w_2, w_3, w_4, w_5, \ldots w_n$
      $W(t=1)=w_2, w_3, w_4, w_5, \ldots w_n, w_1$
      $W(t=2)=w_3, w_4, w_5, \ldots w_n, w_1, w_2$
   whereby the change in state of the windows queue modulo n+1 W(t±1) for a scrolling rate that is the double scroll rate in the first direction is given by
      $W(t=0)=w_1, w_2, w_3, w_4, w_5, \ldots w_n$
      $W(t=1)=w_3, w_4, w_5, \ldots w_n, w_1, w_2$
      $W(t=2)=w_5, \ldots w_n, w_1, w_2, w_3, w_4$.

13. The method according to claim 12, wherein the detecting forces further includes providing cursor control in a third dimension along a plurality of windows stacked upon each other along the third dimension and the cursor control in the third dimension presented on the display includes controlling which one of the plurality of windows is positioned on top to become an active window.

14. The information processing system according to claim 13, wherein the mounting a joystick actuator includes mounting the joystick actuator between the keys of a two button mouse.

15. The method according to claim 12, wherein the force representing a double speed change in pressure and the force that is less than the double speed change in pressure each represent distinct pressures.

16. The method according to claim 12, wherein the force representing a double speed change in pressure and the force that is less than the double speed change in pressure each represent one of two pressures.

* * * * *